(12) United States Patent
Getchius (10) Patent No.: US 8,838,686 B2
(45) Date of Patent: Sep. 16, 2014

(54) METHOD AND APPARATUS FOR DELIVERY OF CONTENT TO A MOBILE DEVICE

(75) Inventor: Jeffrey M. Getchius, Cambridge, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 297 days.

(21) Appl. No.: 12/938,653

(22) Filed: Nov. 3, 2010

(65) Prior Publication Data

US 2012/0110074 A1    May 3, 2012

(51) Int. Cl.
*G06F 15/16* (2006.01)
*H04L 29/08* (2006.01)
*H04W 4/06* (2009.01)
*H04L 29/12* (2006.01)

(52) U.S. Cl.
CPC .............. *H04W 4/06* (2013.01); *H04L 67/26* (2013.01); *H04L 61/1523* (2013.01)
USPC ........... 709/204; 709/206; 709/225; 709/231; 379/210.01

(58) Field of Classification Search
CPC ..... H04L 61/1523; H04L 67/26; H04L 29/06; H04L 29/08072; H04W 4/06; G06Q 10/10
USPC .............. 709/204, 206, 225, 231; 379/210.01
See application file for complete search history.

(56) References Cited

U.S. PATENT DOCUMENTS

| | | | |
|---|---|---|---|
| 7,492,777 B2* | 2/2009 | Ekberg et al. | 370/401 |
| 2003/0206619 A1* | 11/2003 | Curbow et al. | 379/210.01 |
| 2004/0010563 A1* | 1/2004 | Forte et al. | 709/215 |
| 2006/0069687 A1* | 3/2006 | Cui et al. | 707/10 |
| 2006/0248209 A1* | 11/2006 | Chiu et al. | 709/231 |
| 2008/0005347 A1* | 1/2008 | Ott | 709/231 |
| 2009/0083370 A1* | 3/2009 | Franklin et al. | 709/203 |
| 2009/0254659 A1* | 10/2009 | Li et al. | 709/225 |
| 2010/0250685 A1* | 9/2010 | Kunz et al. | 709/206 |
| 2012/0110074 A1* | 5/2012 | Getchius | 709/204 |

* cited by examiner

*Primary Examiner* — Ario Etienne
*Assistant Examiner* — Michael C Lai (57) ABSTRACT

An approach is provided for facilitating the delivery of content to a device through activation of an indicator executable on the device. One or more user devices are determined to receive the content from a content delivery platform using an electronic directory service. An application to provide an indicator representing the content is pushed to the device for initiating a request for the content from the device. In response to the request, a determination is made as to whether to grant the request for delivery of the content to the device.

20 Claims, 10 Drawing Sheets

METHOD AND APPARATUS FOR DELIVERY OF CONTENT TO A MOBILE DEVICE

BACKGROUND INFORMATION

In today's fast-paced, information-driven culture, the publishing and sharing of content with device users in mass is facilitated through various information dissemination and communication techniques, including podcasting, really simple syndication (RSS) feeding, streaming media and the like. Typically, a device user will subscribe to a content delivery service offered by a content services provider to receive the most relevant and up-to-date content corresponding to their preferences. While content preferences vary depending on the context or environment in which the device user is engaged, it is common for organizations, groups and businesses wishing to convey pertinent or sensitive content to employ a directory service for dissemination of content to specific user devices maintained by the directory.

Unfortunately, while helpful for facilitating delivery of content, use of a directory service typically is not sufficient to ensure proper and timely execution of content by the user. For example, a device user may regularly receive podcasts from a content delivery platform to the user device, but never actually play the podcasts. Still further, valuable data and network resources are consumed to fulfill a content request that could have been better allocated for a user intent on executing the content (e.g., listening to the podcast).

Therefore, a way of facilitating the automatic execution of content by a user device is needed.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENT

A preferred apparatus, method and software for facilitating the delivery of content to a device through activation of an indicator executable on the device is described. In the following description, for the purposes of explanation, numerous specific details are set forth to provide a thorough understanding of the preferred embodiments of the invention. It is apparent, however, that the preferred embodiments may be practiced without these specific details or with an equivalent arrangement. In other instances, well-known structures and devices are shown in block diagram form in order to avoid unnecessarily obscuring the preferred embodiments of the invention.

Figure 1:
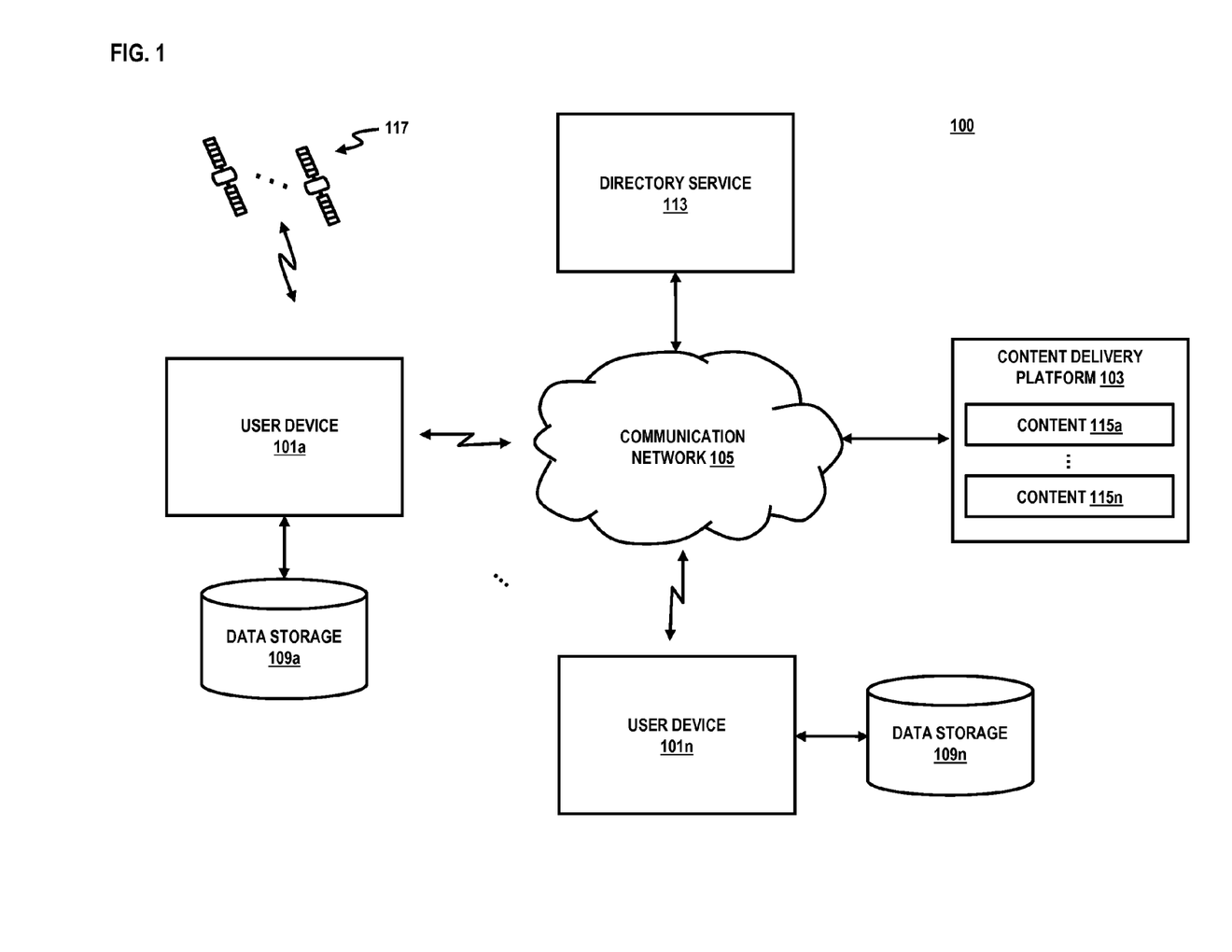
FIG. 1 is a diagram of a system capable of facilitating the delivery of content to a user device, in accordance with an exemplary embodiment.

FIG. 1 is a diagram of a system for facilitating the delivery of select content to a device through activation of an indicator executable on the device, according to an exemplary embodiment. In various embodiments, content can be directed to one or more user devices $101a$-$101n$ in accordance with an established syndication model, automated download or update period, content transmission arrangement or the like. Users of user devices $101a$-$n$ are able to subscribe with a content services provider for the periodic receipt of such content from a content delivery platform 103—i.e., a content management system that facilitates the transmission of select content to subscribers over a communication network 105 in accordance with an arranged syndication, content publishing or other like distribution agreement means. Once received, content is then stored by the devices $101a$-$101n$ in data storage $109a$-$n$ accordingly or played back as streaming data.

Regular and timely delivery and execution of content, particularly in group settings, are key factors for ensuring the effective dissemination of relevant news, intelligence and other communications of critical importance. One technique for communicating and sharing content with members of a group at large is through podcasting, non-streamed webcast, screencasting and other content execution techniques. Podcasting, for example, is a content execution technique where a video or audio message is made available for direct transmission to the devices of group members on a periodic basis. In particular, podcasting involves the creation, syndication and subsequent pushing of content as a web feed to user devices from a central server to a podcatcher active on the device. The podcatcher, operable on the device for detecting web feeds, accesses the pushed content through a subscription process, checks for content updates and downloads any new content automatically or on a manual basis. By pushing content to the user devices through syndication, it can be subsequently executed by the user device offline, making it suitable for execution at anytime.

As presented herein, content capable of being pushed to a device as a podcast, screencast, data stream, etc. is any data capable of being rendered, played, presented and/or manipulated by the device. Such content may include, but is not limited to, video and audio data, streaming data, data files, object code, image data, contextual and semantic data, textual data, media data, etc. Generally, the content once accessed and received by a podcatcher active on a receiving device, is executed with a media player, audio player, video player, web-based content aggregator or the like. Any means of enabling the delivery and execution of streamed and/or non-streamed content is relevant to the exemplary embodiments presented herein.

While podcasting and other content execution techniques are useful modes of communication, the fact that a message is retrieved by a podcatcher or other means by a user device does not ensure that the message is actively executed (e.g., listened to or viewed). Moreover, transmission of audio, video and/or textual content to a group at the same time can consume tremendous network resources, especially when large messages and/or large groups are involved. As a result, content providers expend these resources on messages that are never effectively listened to or viewed (or otherwise experienced) by the recipient. Likewise, for the receiving user device, internal storage is expended on the downloading of content that does not actually get played or viewed by the user. Though automated transmission and downloading of executable content/messages on a periodic communication basis to one or more user devices is useful, a means of triggering the execution of content in a manner that does not tax network resources is needed.

While implementations can vary, the content delivery platform 103 may feature various web management software utilities, servers or a group or suite of applications and tools that enable a content services provider to seamlessly create, edit, review and publish electronic text, audio data, video data or a combination thereof. Moreover, the content delivery platform 103 allows the content to be published in syndication—i.e., disseminating the content via one or more web feeds (for example, the latest news or forum posts). In addition, the content delivery platform 103 executes various protocols and network communication schemes that enable proper formatting and packaging of content for transmission over a communication network 105, and ultimately to enable its execution by one or more user devices 101a-n.

Generally, content delivery platforms 103 are maintained by one or more service providers that ensure the consistent updating and/or generation of content. In one embodiment, the services of content delivery platform 103 can be provided as managed services by a service provider that also a telecommunications service provider of a portion or all of communication network 105. Alternatively, the service provider can be a business entity that provides a particular service. As an example, a service provider, named ACMELegalContent.com, maintains a content delivery platform 103 dedicated to the provision of legal content. In this case, the content is catered to various factions of the law and/or areas of specialization/discipline within the legal community in general, i.e., case law, legal news, family law, jurisprudence topics, etc. Users interested in receiving content from this provider register with the content delivery platform 103 through a web-based subscription/account activation process presented by the ACMELegalContent.com web server. The subscription/account activation and registration process may include, but is not limited to, performance of the following user activities: establishing a user profile (user name, contact info), indicating a device type for receipt of the content, selecting a preferred data format for delivery of the content (e.g., audio, video), indicating the frequency of content delivery to the user device, selecting a subscription level or pricing tier, selecting specific categories and/or subcategories of legal content (e.g., intellectual property news, pharmaceuticals, appellate law, legal careers, ecommerce). Ultimately, the user preferences are defined by the user directly and/or by an overriding administrator on said user's behalf (e.g., an administrator for the organization or group to which the user belongs).

Once the subscription is established, the content delivery platform 103 can provide different types of content 115a-n to different users accordingly based on the aforementioned preferences, requirements and needs. For example, a user of a first user device 101a may receive content 115a per the user's subscription agreement while a second user of user device 101n receives content 115n. In other instances, such as when the users share a common subscription agreement, mutual context such as a like organization, group or business association or other affiliations, user devices 101a-n receive the same content. By way of example, a law firm may arrange for the transmission of regular legal content to be provided by ACMELegalContent.com to all employees who were issued firm provided user devices, i.e., user devices 101a-n.

While the example presented above depicts the content delivery platform 103 as an external or third party resource, the exemplary embodiments presented herein also apply to internally coordinated content delivery platforms 103. Internally coordinated content delivery platforms may be facilitated within a private network, such as that maintained by a business, organization or other group having a computing presence over the communication network 105. The content 115a-n may be generated internally, such as by a group member, the communication department or an affiliated source, and subsequently transmitted via a content delivery platform implemented within the enterprise network infrastructure (e.g., a mobile device enterprise server system). In this example, the means by which users arrange for the transmission of content to their respective user devices be it internally or externally sourced content, is managed by or in conjunction with a network administrator.

Figure 2A:
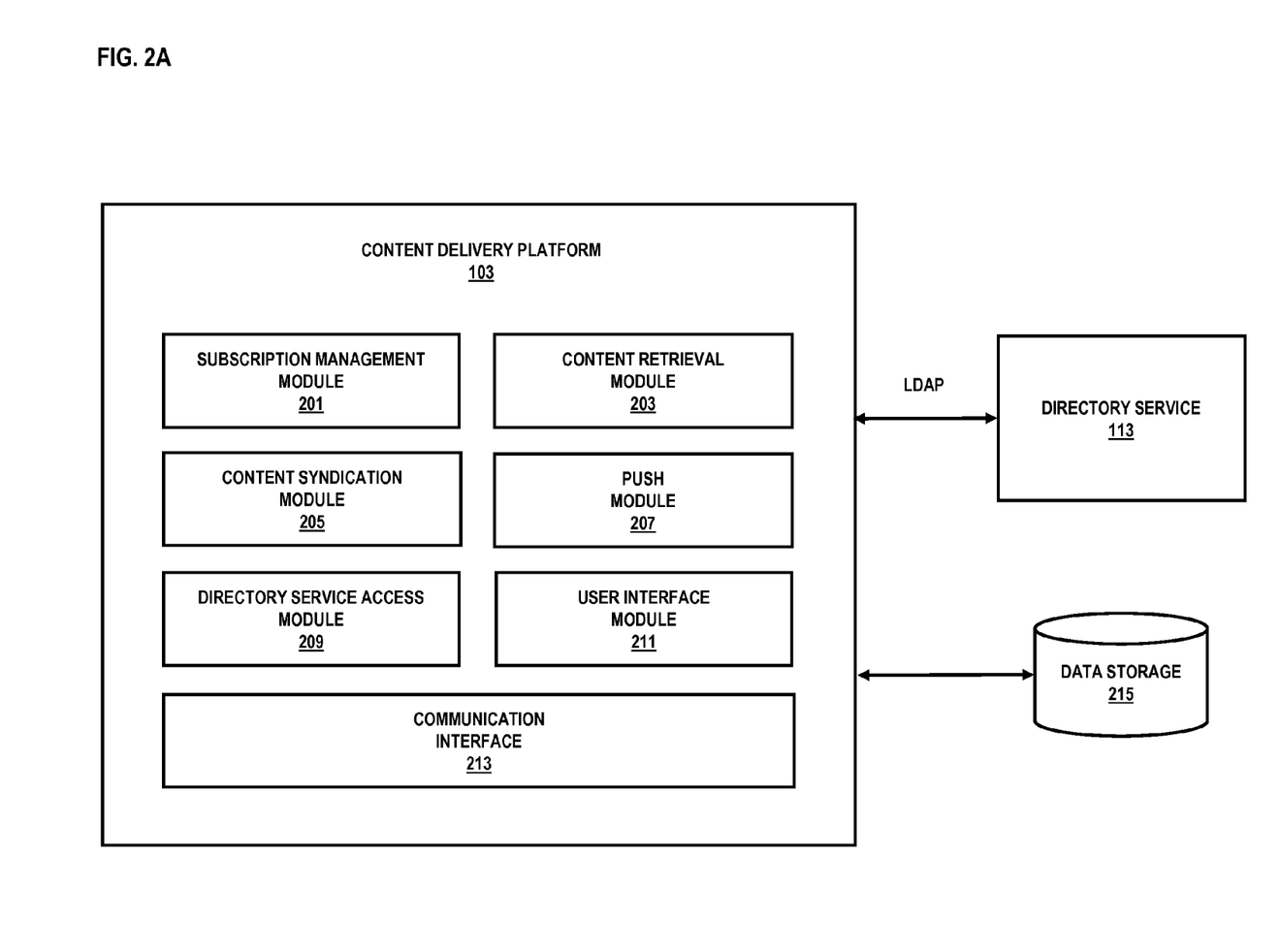
FIGS. 2A and 2B are, respectively, a diagram of a content delivery platform configured to push content to a user device, and a diagram of a user device configured to facilitate the delivery of select content to a user device, in accordance with various exemplary embodiments.

FIG. 2A is a diagram of a content delivery platform configured to push content to a user device, in accordance with an exemplary embodiment. As suggested with respect to the example above, content delivery platforms 103 can be maintained over the communication network 105 by a service provider (or enterprise), and implemented as one or more application server devices and/or as one or more software applications. Various modules may be employed for providing the necessary functions and features of the content delivery platform 103. By way of example, a subscription management module 201 manages the user account registration and/or activation process that allows users to access content. In addition to maintaining user profile information, account preferences data, and the like, the subscription management module 201 also enforces one or more subscriber level policies. Subscription policies may be established and enforced by the content services provider on a paid subscription basis or permission basis, wherein varying subscription levels or tiers determine the type of content a given user may access, the frequency of syndication of the content, the amount of information made available for transmission at a time, the regularity of updates, etc.

In one embodiment, web-based interaction with the content delivery platform 103 for enabling the user or network administrator to specify their settings and features is performed by way of a user interface module 211.

Platform 103 also includes a content retrieval module 203 that allows a requesting user device 101 to retrieve select content from data storage 215 in accordance with their established subscription and/or preferences. In addition, the content retrieval module 203 also provides intelligence for determining whether or not content requests, as received from various devices, are to be granted. The content retrieval module 203 additionally operates in connection with a content syndication module 205 that publishes and/or feeds select content according to a syndication arrangement. In particular, the content syndication module 205 manages the various channels, sites and web feeds through which content is to be disseminated. In addition, the content syndication module 205 manages the release of content or content updates in accordance with a syndication schedule. For example, the content syndication module 205 can restrict the pushing out of content for a lower tier subscriber based on a more limited syndication schedule, while unrestricting the pushing out of content for higher tier subscribers.

Operable in connection with the content syndication module 205 is push module 207, which pushes content from the content delivery platform 103 via a communication interface 213 to one or more subscribing user devices 101 configured over the network 105. The content is pushed out in response to the determined syndication schedule of the content syndication module 205. The push module 207 also facilitates proper packaging and arranging of content for delivery to receiving user devices in accordance with the defined device preferences (e.g., codec settings, preferred data formats). Moreover, the push module 207 can transmit an application to the user devices in response to the availability of content per the content syndication module 205. For example, when a content update is made available for syndication, the push module 207 selects an application that is capable of execution by the user device 101 for providing an indicator (e.g., an icon) representative of the content to be pushed to the user device 101. Of particular note, the application features instructions for rendering an indicator to the interface of the user device 101, in which the execution is a precursor to the pushing of content to the device 101. One or more applications for providing indicators representative of content are maintained in data storage 215 for representing varying types of content—i.e., an indicator for indicating the first time content has been published versus an update to prior downloaded content.

Operating in connection with the content delivery platform 103 of system 100, in accordance with various embodiments, is a directory service 113. The directory service 113 is employed by the content delivery platform 103 to properly direct content to the one or more user devices 101a-n. To facilitate interaction with the directory service 113, the content delivery platform 103 executes a directory service access module 209. The directory service access module 209 provides communication between the directory service 113 and the push module 207 for controlling content delivery. The directory service access module 209 also ensures that content is directed by way of the directory service 113 to subscribing users on the predetermined schedule maintained by the content syndication module 205, i.e., such as during off-peak hours of operation.

The directory service 113 is a network service that identifies all resources configured to a given network and makes them accessible to users and applications i.e., accessible to the content delivery platform 103. For example, user devices 101a-n are considered resources within the directory service 113 of an organization, each of the user devices 101a-n being identified by the directory service 113 in accord with a naming convention corresponding to the topology of the directory service 113 (e.g., database topology thereof). While user devices 101a-n represent a specific type of resource, others maintained by the directory service 113 may include, but are not limited to, e-mail addresses, phone numbers, employee or group identifiers, specific documents and data files, computers and peripheral devices such as printers.

Generally, the directory service 113 provides for the use of protocols that readily enable access to select information by users associated with the directory service 113 or third party entities, such as the content delivery platform 103 (as permitted by an organization). Exemplary directory service 113 topologies and/or protocols may include, but is not limited to, Lightweight Directory Access Protocol (LDAP), which can be used for e-mail addresses, Domain Name System (DNS) as used frequently for organizing and naming computers, services and other resources connected to the communication network 105 or a private network or Netware Directory Service (NDS). As an application protocol, LDAP can support directory services over TCP/IP (Transmission Control Protocol/Internet Protocol), and is more detailed in Internet Engineering Task Force (IETF) Request for Comment (RFC) 4510, which is incorporated herein by reference in its entirety. The exemplary directory service 113 as presented herein is not limited to any one particular approach.

In one embodiment, the directory service 113 is made available to the content delivery platform 103 at the discretion of an administrator of directory service 113 to enable the coordinated direction of content transmissions to select users and/or user devices. For example, a network administrator of a corporation that maintains one or more servers for housing the directory service 113 may enable the appropriate security settings and access configurations required for the content delivery platform 103 to transmit a podcast to select computers or user devices configured to the internal network. Of particular note, the directory service 113 and content delivery platform 103 may operate in tandem to maintain a record of which content has been transmitted to and/or downloaded by which user device, when such transmission and/or downloading occurred and other pertinent details. In this way, the content delivery platform 103 avoids the transmission/pushing of repeat content while staying up-to-date on the current content needs of the user. The above described elements of the system 100 are communicable with one another over communication network 105. In system 100, according to certain embodiments, communication network 105 may be one or more of a combination of a data network, service provider network, telephony network, and/or wireless network, configured to handle various communication sessions, voice communications as well as non-voice communications. Communication network 105 may be any suitable wireline and/or wireless network. In the example of a telephony network, communication network 105 may include a circuit-switched network, such as the public switched telephone network (PSTN), an integrated services digital network (ISDN), a private branch exchange (PBX), or other like network.

When configured for wireless communication, communication network 105 may employ various technologies including, for example, code division multiple access (CDMA), enhanced data rates for global evolution (EDGE), general packet radio service (GPRS), mobile ad hoc network (MANET), global system for mobile communications (GSM), Internet protocol multimedia subsystem (IMS), universal mobile telecommunications system (UMTS), etc., as well as any other suitable wireless medium, e.g., microwave access (WiMAX), wireless fidelity (WiFi), long term evolution (LTE), satellite, and the like. Meanwhile, when configured as a data network, communication network 105 may be any local area network (LAN), metropolitan area network (MAN), wide area network (WAN), the Internet, or any other suitable packet-switched network, such as a commercially owned, proprietary packet-switched network, such as a proprietary cable or fiber-optic network.

Additionally, the communication network 105 may embody circuit-switched and/or packet-switched networks that include facilities to provide for transport of circuit-switched and/or packet-based communications. It is further contemplated that the communication network 105 includes components and facilities to provide for signaling and/or bearer communications between the various components or facilities of system 100. In this manner, the network 105 may embody or include portions of a signaling system 7 (SS7)

network, or other suitable infrastructure to support control and signaling functions. As such, network 105 may be adapted to facilitate the content transmission and execution services of system 100.

While the various embodiments discussed herein pertain to the transmission of content to user devices through a directory service 113, the principles apply to any type of user device through which data may be received or relayed. User devices 101a-n may include, but is not limited to, mobile devices (e.g., cellular phones, BLUETOOTH-enabled devices, WiFi-enable devices, etc.), a set-top box (STB), a computer (e.g., desktop computer, laptop, web appliance, netbook, iPad, etc.) and voice station. Regardless of type, generally, user devices are configured to communicate over the wireless communication network 105 using voice sessions as well as other non-voice sessions, e.g., short messaging service (SMS), enhanced messaging service (EMS), multimedia messaging service (MMS), instant messaging (IM), etc. Also, the devices may convey geographical or spatial information with a constellation of global positioning system (GPS) satellites 117, such as to enable location detection, by way of example. User devices may be any cellular phone, radiophone, satellite phone, smart phone, wireless phone or any other suitable mobile device, such as a personal digital assistant (PDA, Blackberry), pocket personal computer, tablet, customized hardware, etc. The specific configuration of a user device for enabling content execution is more fully detailed in FIG. 2A.

Figure 3:
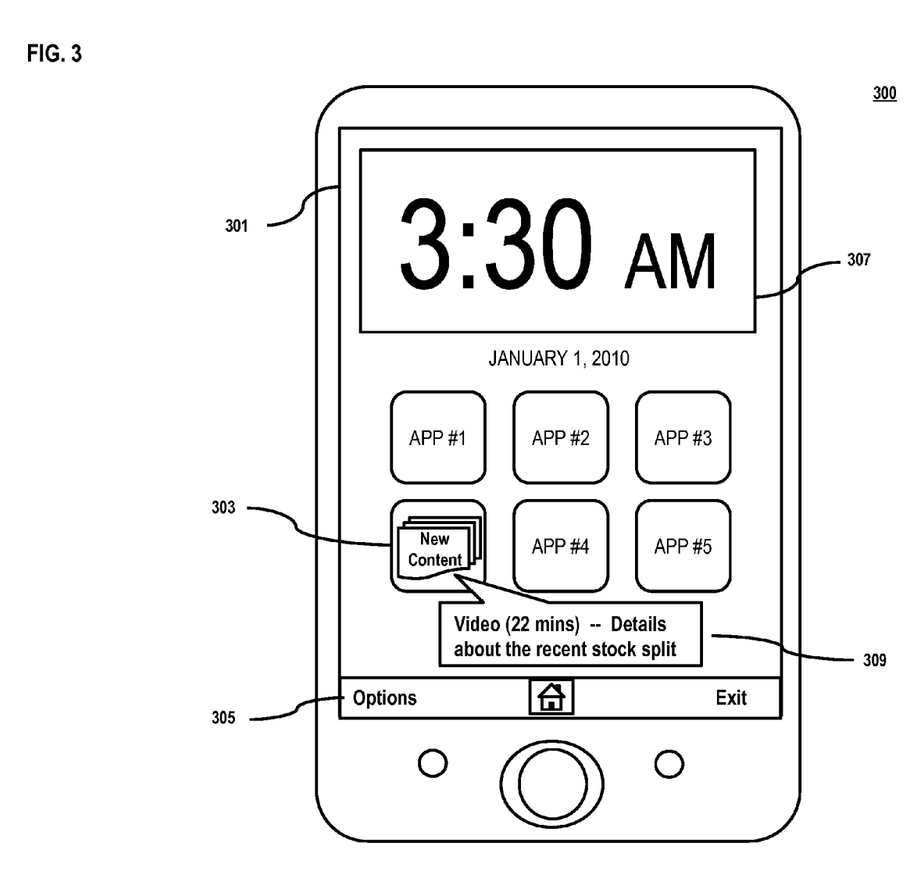
FIG. 3 is a diagram of a graphical user interface (GUI) of a user device configured to facilitate the download of content to the device through activation of an indicator executable on the device, according to an exemplary embodiment.

FIG. 2A is a diagram of a user device configured to enable the execution of content as transmitted by a content delivery platform through the activation of an indicator, according to an exemplary embodiment. Specifically, the indicator is passed on to the user device 101 by the content delivery platform 103 in connection with the directory service 113 and then rendered to the graphical user interface of the user device 101 for enabling user activation. FIG. 3 presents an exemplary diagram of a graphical user interface (GUI) of a user device 101 as configured to enable the execution of content through activation of said indicator, according to an exemplary embodiment.

Figure 2B:
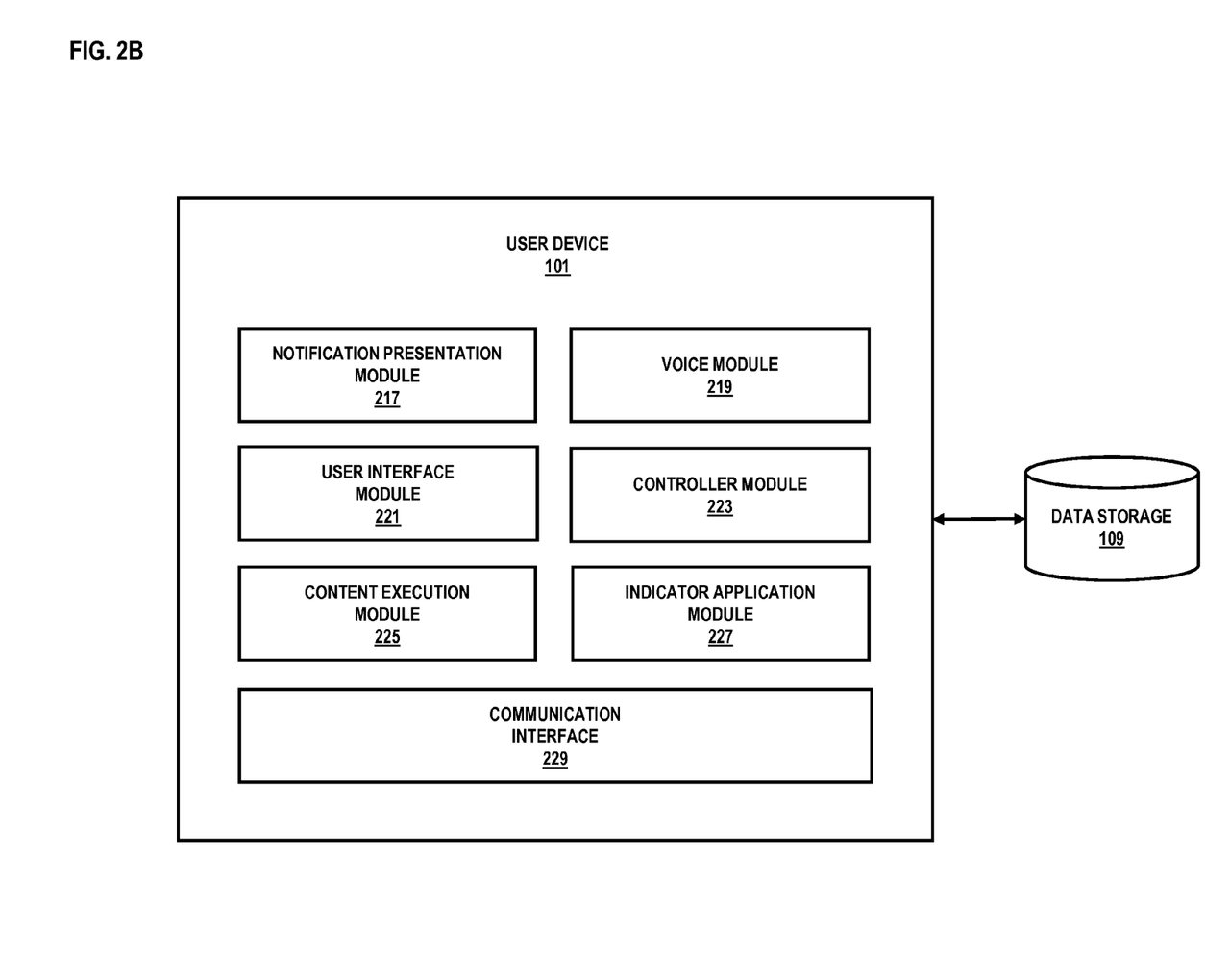
Figure 6:
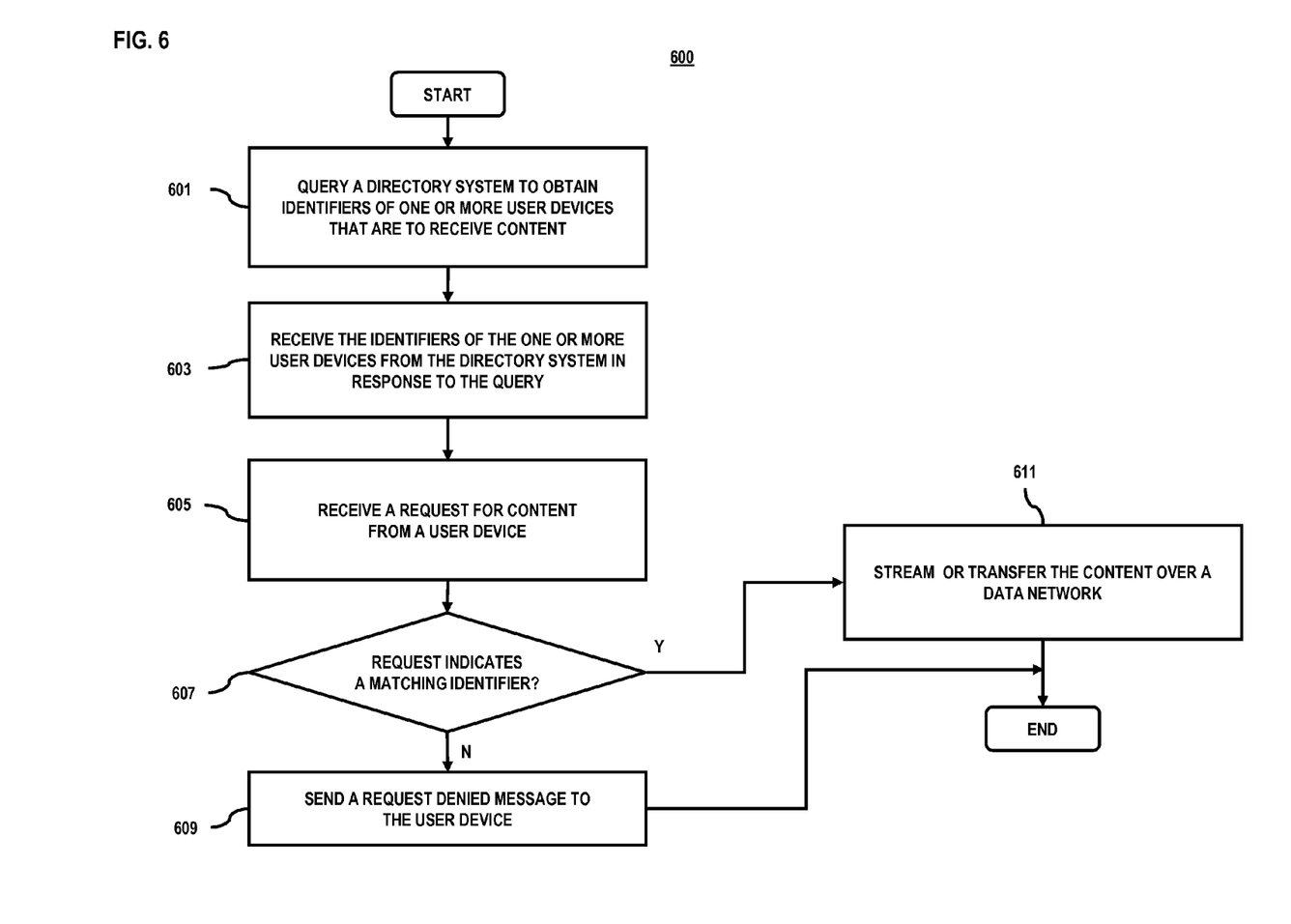
FIG. 6 is a flowchart of a process for enabling the transfer of content by a delivery platform in response to activation of an indicator executable on a user device, according to various embodiments.

With respect to FIG. 2B, the user device 101, which may be a mobile phone (as depicted in FIGS. 3 and 6), mobile computer or other wireless communication device includes a notification presentation module 217 that is configured to support text based communication—i.e., present and create text-based notification messages. In addition, the device 101 includes a voice module 219 configured to establish a voice-based call. Such voice-based calls can be traditional plain-old-telephone service (POTS) calls or packetized voice calls (e.g., VoIP). These communication sessions can occur concurrently during a call. It is noted that these communication sessions can be established over a circuit-switched network, a packet-switch network or a combination thereof. Thus, communication interface 229 can be appropriately configured depending on the transport systems and/or communication network 105 elements involved.

Still further, a user interface module 221 enables presentment of data to a graphical user interface of the user device 101. Various software applications operable by the user device may feature application programming interfaces (APIs) or other function calls corresponding to the user interface module 221 for enabling graphical elements to be displayed by the device. This includes, but is not limited to, the application pushed to the device 101 by the push module 207 of the content delivery platform 103 for presenting to the interface indicators representative of content available for download. It is noted that in some instances multiple communication interfaces may be utilized depending on the type of user device involved. Moreover, the user device 101 employs the user interface module 221 to enable control by the user of the device 101 of various communication features during a session. Additionally, a controller module 223 is configured to coordinate the concurrent communication sessions provided by the notification presentation module 217 and voice module 219. For example, the controller module 223 generates the appropriate signals to control the communication interface 229 for transmission over the voice channel and the messaging channel.

Also operable in connection with the user device 101 are the content execution module 225 and indicator application module 227. The content execution module 225 enables the viewing, playing and/or rendering of digital content maintained in data storage 109 as provided by the content delivery platform 103. Likewise, the content execution module 225 executes the appropriate instructions for decoding the received content properly, including the processing of video/audio codecs, the performance of various compression or decompression techniques, etc. Exemplary applications useful for execution as, or in connection with the content execution module 225 may include, but are not limited to, a digital media player, an MP3 player or other audio player, a video player, a podcast feedback mechanism or any other application or software suited for the execution of content of various formats. Exemplary formats for video content may include, but is not limited to, MPEG, AVI, Real Video and QuickTime, while exemplary audio formats aside from MP3 may include, but is not limited to AAC, WMA, WAV and AIFF. In the case of video and/or audio content, the user interface module 229 operates in connection with the content execution module 225 and controller module 223; for example, to render video content to the graphical user interface and audio content to the internal speakers of the user device.

The indicator application module 227 enables the receipt and execution of an application for rendering of an indicator to the graphical user interface of the user device 101 in response to the determined availability of content for the user device 101. As mentioned previously, the application enables presentment of an indicator to the device interface as a graphical element, icon, hyperlink, button, symbol, message queue or other visual indicator, which upon activation (e.g., clicking, selecting, etc.) by the user, triggers the content delivery platform 103 to push/transmit the scheduled content to the requesting user. In some instances, the visual indicator may be accompanied by a sound or physical indicator, such as an alarm or vibration for alerting the user of the rendering of the indicator to the device interface. FIG. 3 shows an exemplary user device 300 that features a graphical user interface 401 with various indicators as graphical elements, in the form of icons, presented thereon. In this example, a desktop feature of the mobile device 300 is presented to the display 301 from which the user can select one or more applications to launch (labeled as APP #1 through APP #5) via a soft touch screen or hard keypad, invoke various device or user options 305, view a digital clock 307, etc. While not shown expressly, the one or more applications may be represented by one or more icons that depict the particular application, which upon user selection, results in the execution of the application.

Likewise, in accordance with the one embodiment, an indicator 303 in the form of an icon is also presented to the interface 301 for representing the availability of new content for download from the content delivery platform 103. Depending on device capabilities or user preferences, the indicator application module 227 can be made to enable the icon 303 to blink or appear/disappear depending on availability of content, vary between different images as an animation or avatar, cause an associated sound or any other means of user alert or notification. Also, the icon 303 may also have associated therewith, i.e., as metadata, useful profile information 309 for providing a description of the content in question that is to be downloaded in connection with activation of the icon. For example, the user can one-click, press and hold, mouseover or perform any other triggering action with respect to the icon 303 based indicator, thereby causing a caption 309 containing the profile information to be displayed. Alternatively, the profile information can be invoked in connection with the indicator without user invocation, such as in the form of a scrolling message prompt. These and various other approaches are feasible for the exemplary embodiments herein. In the event of full selection of the icon 303 form of indicator (e.g., a double-click activation) from the desktop by the user, a procedure is followed to render execution of the content, as depicted with respect to FIGS. 4-6.

Figure 4:
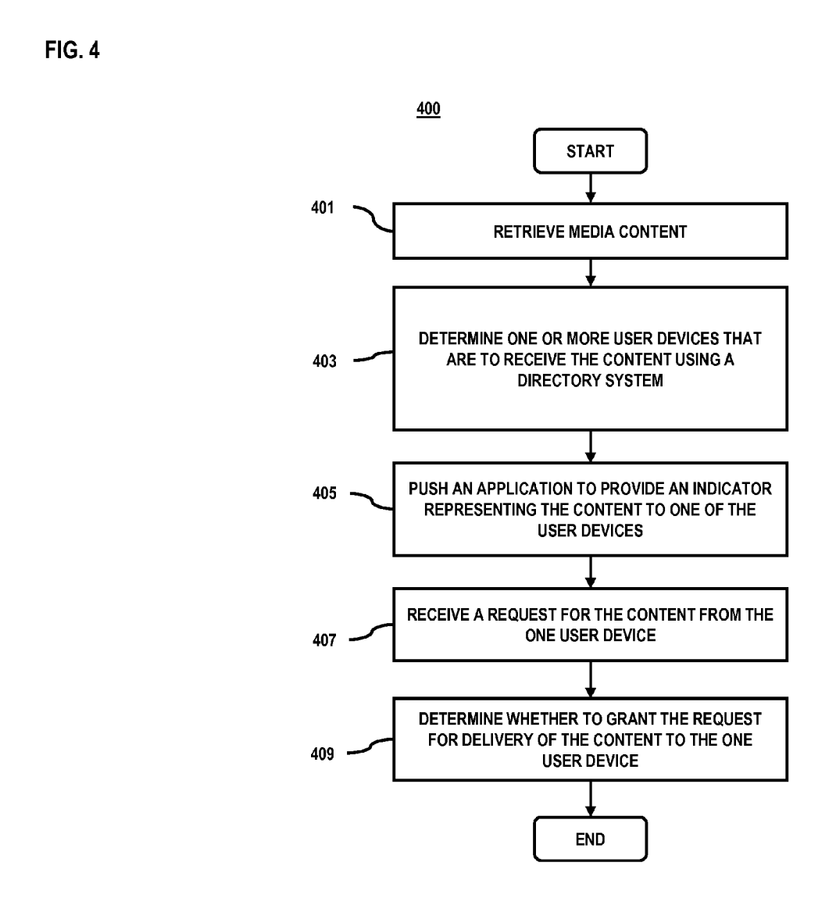
FIGS. 4 and 5 are flowcharts of a process for facilitating the delivery of select content to a user device through activation of an indicator executable on the device, according to various embodiments.
Figure 5:
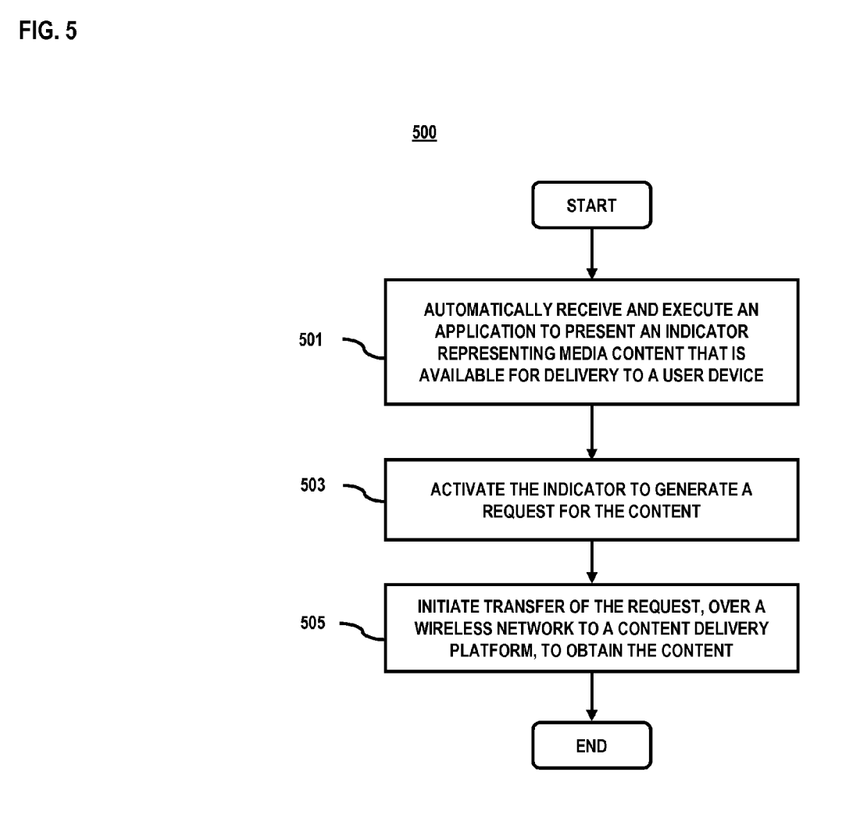

FIGS. 4 and 5 are flowcharts of a process for facilitating the delivery of select content to a user device through activation of an indicator executable on the device, according to various embodiments. In step 401 of process 400, media content is retrieved by the content delivery platform 103. In step 403, a determination is made as to which of the devices 101a-n are to receive the retrieved content. In one embodiment, this determination is made by the content delivery platform 103 based, at least in part, on the use of a directory system configured to provide an electronic directory service 113. The configuration of the directory service 113 may include maintenance of a content delivery schedule, a listing of specific resources to receive the content, a current version of content, last download data, etc. While implementation approaches may vary, the directory service 113 may also coordinate the determination process based, at least in part, on known subscription and user preferences as maintained by the content delivery platform 103.

In step 405, an application is pushed by the content delivery platform to a determined recipient user device. The pushed application provides an indicator representing the content for which the user device is to receive from the content delivery platform 103—the indicator being pushed prior to pushing of the actual content. Also, as mentioned previously, the application for providing said indicator may also have associated therewith profile information, such as in the form of a certain schema syntax or metadata that is descriptive of the intended content to ultimately be downloaded/pushed to the device.

In step 407, the content delivery platform 103 operating in connection with the directory service receives a request for the content from the user device to which the application was pushed. The request for delivery of the content to the user device is triggered or signaled to the content delivery platform 103 by way of activation of the indicator pushed to the user device 101, i.e., as described with respect to FIG. 3. Once the request is received, in accordance with a further step 409, a determination is then made as to whether or not to grant the request of delivery of the content to the user device 101.

In step 501 of process 500, an application to present an indicator representing media content that is available for delivery to the user device is automatically received and executed by the user device 101. In step 503, the user activates the indicator as it is rendered to the device user interface to generate a request for the content. In yet another step 505, the user device 101 initiates transfer of the request over a wireless network to the content delivery platform 103 to obtain the content.

With respect now to FIG. 6, a flowchart of a process for enabling the transfer of content by a content delivery platform in response to activation of an indicator executable on a user device is shown, in accordance with one embodiment. As earlier described, the content delivery platform 103 interacts with the directory service 113 to identify and/or select user devices to transmit content to over the network 105. As seen in process 600, per step 601, the directory system (for providing a directory service 113) is queried by the content delivery platform 103 in order to obtain identifiers of one or more user devices 101 that are scheduled to receive content 115. The identifiers may be specified as a domain name entry, internet protocol (IP) Address, device identifier, or other attribute, object or value corresponding to the topology of the directory service. In response to the query, the content delivery platform 103 receives the identifiers of the one or more user devices 101 for which content 115 is to be directed, corresponding to step 603.

Having identified the appropriate recipients, the content delivery platform 103 is able to identify a specific device (e.g., devices 101a-n) to direct content to in response to a request as initiated by way of step 503 of FIG. 5. The initiated request is received by the content delivery platform 103; the request indicating at least an identifier associated with the user device as in step 605. In step 607, a determination is made by the content delivery platform 103 as to whether the identifier indicated in the request matches any identifiers specified by the delivery service 113. When a match is identified, the content intended specifically for the user device associated with said identifier is streamed or transferred over the data network to the requesting device, as specified in step 611. The transfer process may be completed by way of a server side transformation as performed by the content delivery platform 103 followed by, for instance, an internal database lookup for accessing the specific content associated with the device. Conversely, when the identifier indicated with the request does not match the known list of identifiers indicated by the directory service, the request for content is denied. This corresponds to optional step 609. Once the content is streamed or transferred to the user device, as depicted in step 611, the content is executed by the user device accordingly.

Figure 7:
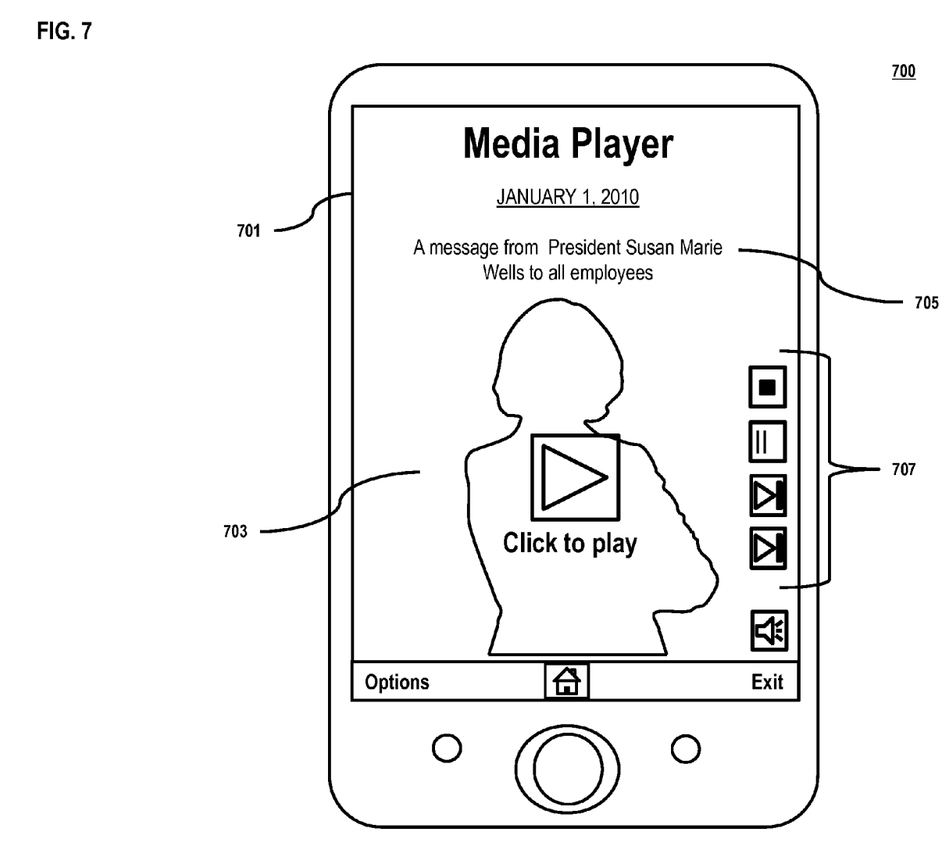
FIG. 7 is a diagram of a graphical user interface (GUI) of a user device for executing content as transferred to the device from a content delivery platform, according to an exemplary embodiment.

FIG. 7 is a diagram of a graphical user interface (GUI) of a user device 700 for executing content in response to the transfer of content to the device from the content delivery platform, according to an exemplary embodiment. In this exemplary depiction, the device 700 executes playback of video content 703 via the graphical user interface 701. The content as transferred results in execution of a media player, i.e., the media player compatible for playback of the content via the device 700 according to the received data format. The video content may also be accompanied by a message 705 indicating details regarding the video content—i.e., profile data, metadata, etc. As the content is automatically executed/played upon completion of or during download, the user may pause, forward, rewind or stop execution at their own discretion using control buttons 707. It is noted that automated invocation of the media player as depicted in FIG. 7 is preceded by activation of the application for rendering the indicator 303 as depicted in FIG. 3.

It is noted that the above described processes, in certain exemplary embodiments, provide for effective delivery and execution of content to a user device, i.e., as a podcast message. Moreover, actual execution of the message is performed on demand, the execution being triggered automatically by user activation of an indicator that is rendered to the display of a user device resulting from an application being pushed to the device by the content delivery platform. Unlike traditional approaches to content enablement, particularly for podcasts, screencasts, streaming media and the like, the approach as presented herein provides a higher level of assurance that the content is actually played, listened to or enjoyed by the user. Moreover, content delivery is performed in a manner that more effectively utilizes network resources respective to those messages that are actually executed by the user.

The processes described herein for providing content to devices may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 8:
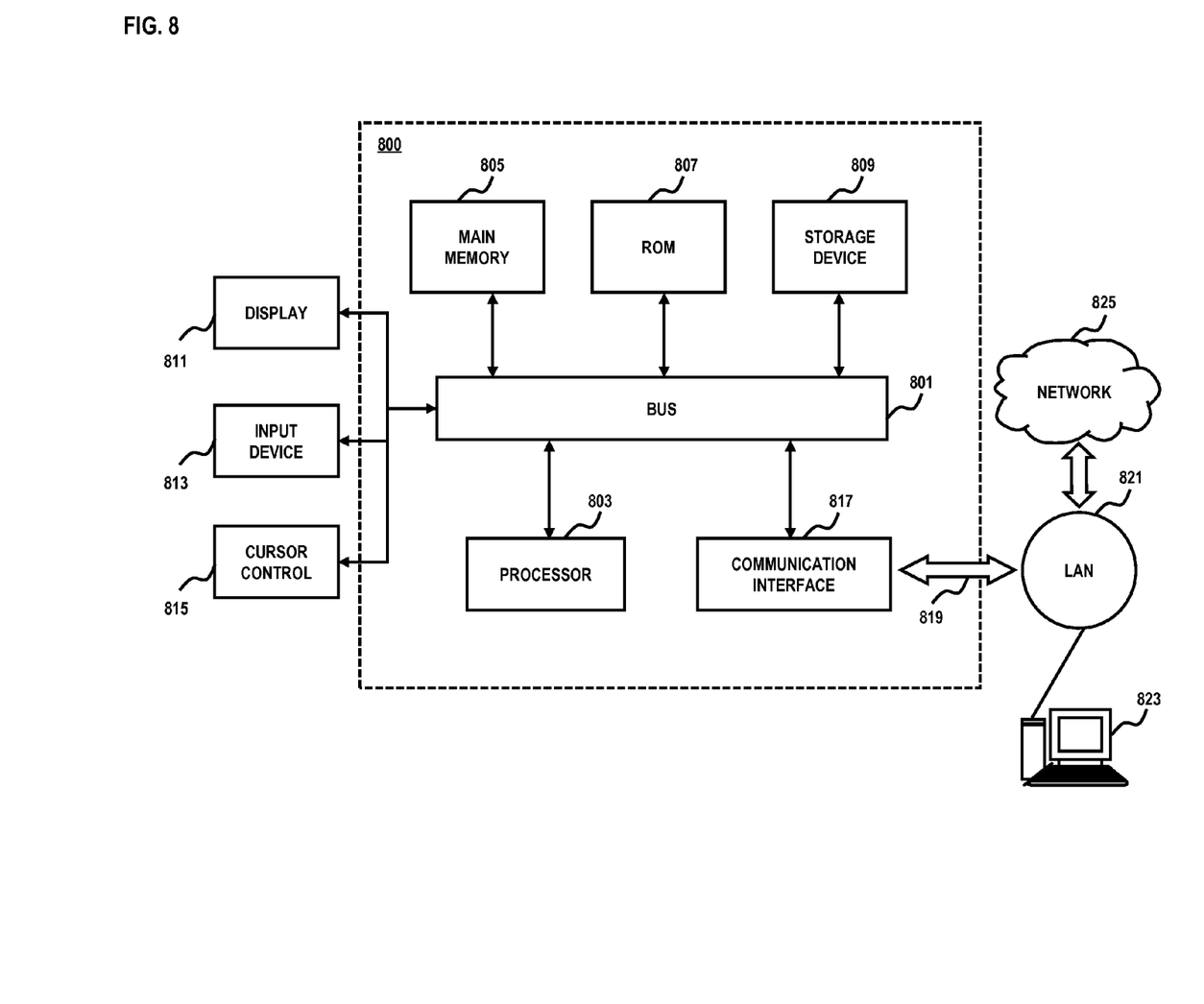
FIG. 8 is a diagram of a computer system that can be used to implement various exemplary embodiments.

FIG. 8 illustrates computing hardware (e.g., a computer system) upon which these embodiments can be implemented. The computer system 800 includes a bus 801 or other communication mechanism for communicating information and a processor 803 coupled to the bus 801 for processing information. The computer system 800 also includes main memory 805, such as random access memory (RAM) or other dynamic storage device, coupled to the bus 801 for storing information and instructions (computer program code) to be executed by the processor 803. Main memory 805 also can be used for storing temporary variables or other intermediate information during execution of instructions by the processor 803. The computer system 800 may further include a read only memory (ROM) 807 or other static storage device coupled to the bus 801 for storing static information and instructions for the processor 803. A storage device 809, such as a magnetic disk or optical disk, is coupled to the bus 801 for persistently storing information and instructions.

The computer system 800 may be coupled via the bus 801 to a display 811, such as a cathode ray tube (CRT), liquid crystal display, active matrix display, or plasma display, for displaying information to a computer user. An input device 813, such as a keyboard including alphanumeric and other keys, is coupled to the bus 801 for communicating information and command selections to the processor 803. Another type of user input device is a cursor control 815, such as a mouse, a trackball, or cursor direction keys, for communicating direction information and command selections to the processor 803 and for controlling cursor movement on the display 811.

According to certain embodiments, the processes described herein are performed by the computer system 800, in response to the processor 803 executing an arrangement of instructions contained in main memory 805. Such instructions can be read into main memory 805 from another computer-readable medium, such as the storage device 809. Execution of the arrangement of instructions contained in main memory 805 causes the processor 803 to perform the process steps described herein. One or more processors in a multi-processing arrangement may also be employed to execute the instructions contained in main memory 805. In alternative embodiments, hard-wired circuitry may be used in place of or in combination with software instructions to implement the embodiment of the invention. Thus, embodiments of the invention are not limited to any specific combination of hardware circuitry and software.

The computer system 800 also includes a communication interface 817 coupled to bus 801. The communication interface 817 provides a two-way data communication coupling to a network link 819 connected to a local network 821. For example, the communication interface 817 may be a digital subscriber line (DSL) card or modem, an integrated services digital network (ISDN) card, a cable modem, a telephone modem, or any other communication interface to provide a data communication connection to a corresponding type of communication line. As another example, communication interface 817 may be a local area network (LAN) card (e.g. for Ethernet™ or an Asynchronous Transfer Model (ATM) network) to provide a data communication connection to a compatible LAN. Wireless links can also be implemented. In any such implementation, communication interface 817 sends and receives electrical, electromagnetic, or optical signals that carry digital data streams representing various types of information. Further, the communication interface 817 can include peripheral interface devices, such as a Universal Serial Bus (USB) interface, a PCMCIA (Personal Computer Memory Card International Association) interface, etc. Although a single communication interface 817 is depicted in FIGS. 3 and 7, multiple communication interfaces can also be employed.

The network link 819 typically provides data communication through one or more networks to other data devices. For example, the network link 819 may provide a connection through local network 821 to a host computer 823, which has connectivity to a network 825 (e.g. a wide area network (WAN) or the global packet data communication network now commonly referred to as the "Internet") or to data equipment operated by a service provider. The local network 821 and the network 825 both use electrical, electromagnetic, or optical signals to convey information and instructions. The signals through the various networks and the signals on the network link 819 and through the communication interface 817, which communicate digital data with the computer system 800, are exemplary forms of carrier waves bearing the information and instructions.

The computer system 800 can send messages and receive data, including program code, through the network(s), the network link 819, and the communication interface 817. In the Internet example, a server (not shown) might transmit requested code belonging to an application program for implementing an embodiment of the invention through the network 825, the local network 821 and the communication interface 817. The processor 803 may execute the transmitted code while being received and/or store the code in the storage device 809, or other non-volatile storage for later execution. In this manner, the computer system 800 may obtain application code in the form of a carrier wave.

The term "computer-readable medium" as used herein refers to any medium that participates in providing instructions to the processor 803 for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 809. Volatile media include dynamic memory, such as main memory 805. Transmission media include coaxial cables, copper wire and fiber optics, including the wires that comprise the bus 801. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

Figure 9:
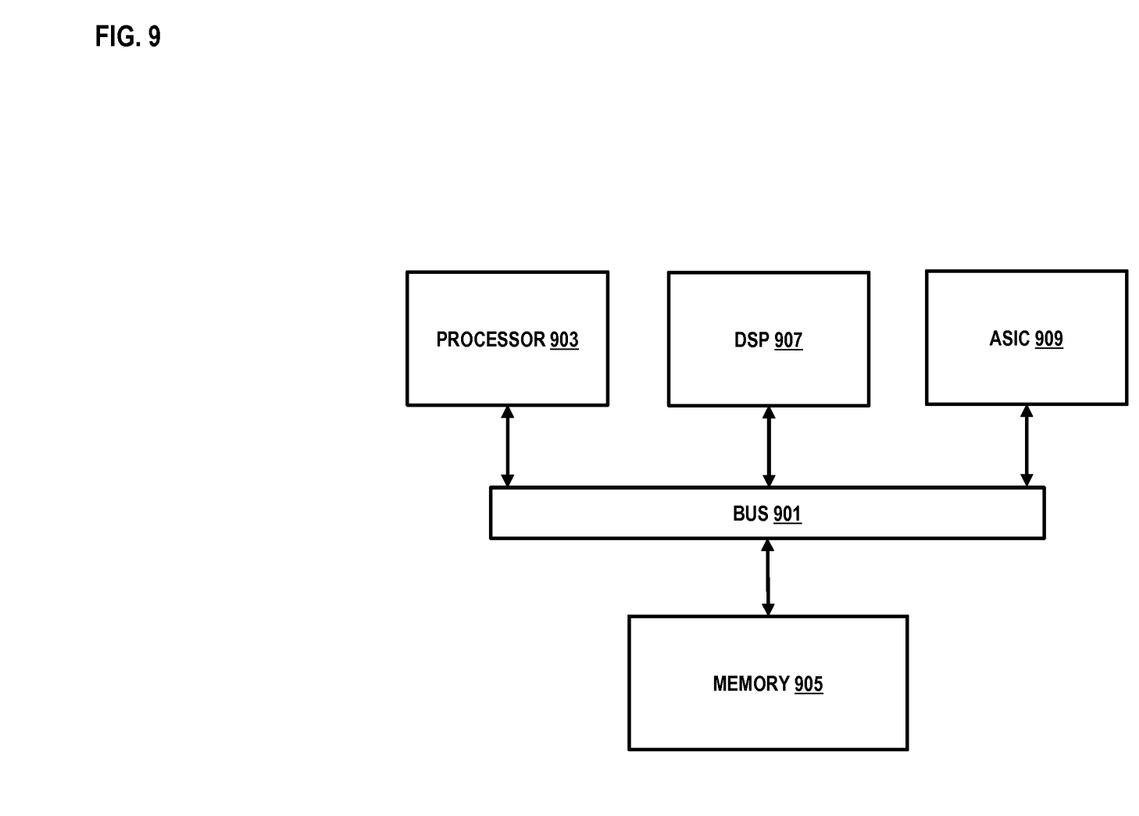
FIG. 9 is a diagram of a chip set that can be used to implement various exemplary embodiments.

FIG. 9 illustrates a chip set 900 upon which an embodiment of the invention may be implemented. Chip set 900 is programmed to present a slideshow as described herein and includes, for instance, the processor and memory components described with respect to FIG. 8 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 900, or a portion thereof, constitutes a means for performing one or more steps of FIGS. 4-6.

In one embodiment, the chip set 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real time independently of the processor 903. Similarly, an ASIC 909 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 903 and accompanying components have connectivity to the memory 905 via the bus 901. The memory 905 includes both dynamic memory (e.g., RAM, magnetic disk, writable optical disk, etc.) and static memory (e.g., ROM, CD-ROM, etc.) for storing executable instructions that when executed perform the inventive steps described herein to controlling a set-top box based on device events. The memory 905 also stores the data associated with or generated by the execution of the inventive steps.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
retrieving media content;
determining one or more user devices that are to receive the media content using a directory system configured to provide an electronic directory service, wherein the electronic directory service is a network service that identifies all resources configured to a given network and an administrator of the electronic directory service determines the one or more user devices that can access each of the resources, and wherein determining one or more user devices that are to receive the media content includes:
generating a query to obtain identifiers of the one or more user devices from the directory system, and
receiving the identifiers of the one or more user devices from the directory system in response to the query;
pushing an application to provide an indicator representing the media content to one of the user devices;
receiving a request for the media content from the one of the user devices, the request including an ID associated with the one of the user devices; and
determining whether to grant the request for delivery of the media content to the one of the user devices based on whether the ID included in the received request matches any of the identifiers of the one or more user devices in the directory system,
wherein the indicator indicates a first indication for a first time that the media content has been published when the media content has not been previously published, and indicates a second indication, different from the first indication, for an update to the media content when the media content has been previously published,
wherein the pushed application includes information describing at the one of the user devices what the media content that is to be delivered is about and the information is displayed at the one of the user devices prior to triggering the request for the media content, and
wherein the request for the media content from the one of the user devices is triggered by activating the indicator representing the media content.

2. A method according to claim 1, further comprising:
initiating transmission of the media content to the one of the user devices over a wireless network as a podcast.

3. A method according to claim 1, wherein the directory system is configured to provide the directory service according to a lightweight directory access protocol (LDAP).

4. A method according to claim 1, wherein the delivery of the media content, includes:
streaming the media content over a data network, or transferring the media content as a file over the data network.

5. A method according to claim 1, wherein the application is pushed according to a predetermined schedule relating to off-peak hours of operations for the one of the user devices.

6. An apparatus comprising:
at least one processor; and
at least one memory including computer program code, and the at least one processor, when executing the computer program code, causes the apparatus at least to:
retrieve media content;

determine one or more user devices that are to receive the media content using a directory system configured to provide an electronic directory service, wherein the electronic directory service is a network service that identifies all resources configured to a given network and an administrator of the electronic directory service determines the one or more user devices that can access each of the resources, and wherein determine one or more user devices that are to receive the media content includes:
generate a query to obtain identifiers of the one or more user devices from the directory system, and
receive the identifiers of the one or more user devices from the directory system in response to the query;
push an application to provide an indicator representing the media content to one of the user devices;
receive a request for the media content from the one of the user devices, the request including an ID associated with the one of the user devices; and
determine whether to grant the request for delivery of the media content to the one of the user devices based on whether the ID included in the received request matches any of the identifiers of the one or more user devices in the directory system,
wherein the indicator indicates a first indication for a first time that the media content has been published when the media content has not been previously published, and indicates a second indication, different from the first indication, for an update to the media content when the media content has been previously published,
wherein the pushed application includes information describing at the one of the user devices what the media content that is to be delivered is about and the information is displayed at the one of the user devices prior to triggering the request for the media content, and
wherein the request for the media content from the one of the user devices is triggered by activating the indicator representing the media content.

7. An apparatus according to claim 6, wherein the apparatus is further caused to:
initiate transmission of the media content to the one of the user devices over a wireless network as a podcast.

8. An apparatus according to claim 6, wherein the directory system is configured to provide the directory service according to a lightweight directory access protocol (LDAP).

9. An apparatus according to claim 6, wherein the delivery of the media content includes:
streaming the media content over a data network, or transferring the media content as a file over the data network.

10. An apparatus according to claim 6, wherein the application is pushed according to a predetermined schedule relating to off-peak hours of operations for the one of the user devices.

11. A method comprising:
automatically receiving and executing, at a user device, an application to present an indicator representing media content that is available for delivery to the user device from a content delivery platform, wherein the user device is determined to be a recipient of the application based on a directory system configured to provide an electronic directory service, wherein the electronic directory service is a network service that identifies all resources configured to a given network and an administrator of the electronic directory service determines user devices that can access each of the resources based on identifiers of the user devices, wherein the content delivery platform is configured (i) to determine the user devices to receive the application based on a query to the directory system to obtain the identifiers of the user devices that are to receive the media content, (ii) to receive from the directory system the identifiers of the user devices that are to receive the media content in response to the query, and (iii) to push the application to present the indicator representing the media content to the user device based on the received identifiers;
activating the indicator to generate a request for the media content, the request including an ID associated with the user device;
initiating transfer of the request, over a wireless network to the content delivery platform, to obtain the media content; and
receiving the media content based on the content delivery platform determining that the ID included in the request for the media content matches one of the identifiers of the user devices in the directory system,
wherein the indicator indicates a first indication for a first time that the media content has been published when the media content has not been previously published, and indicates a second indication, different from the first indication, for an update to the media content when the media content has been previously published, and
wherein the received application includes information describing at the user device what the media content that is to be delivered is about and the information is displayed at the user device prior to initiating triggering of the request for the media content.

12. A method according to claim 11, further comprising:
receiving the media content over a wireless network as a podcast.

13. A method according to claim 11, wherein the directory system is configured to provide the directory service according to a lightweight directory access protocol (LDAP) to the content delivery platform.

14. A method according to claim 11, further comprising:
receiving the media content over a data network as a stream, or
receiving the media content as a file over the data network.

15. A method according to claim 11, wherein the application is received according to a predetermined schedule relating to off-peak hours of operations for the user device, the predetermined schedule being managed by the content delivery platform.

16. An apparatus comprising:
at least one processor; and
at least one memory including computer program code, and the at least one processor, when executing the computer program code, causes the apparatus at least to:
automatically receive and execute, at a user device, an application to present an indicator representing media content that is available for delivery to the user device from a content delivery platform, wherein the user device is determined to be a recipient of the application based on a directory system configured to provide an electronic directory service, wherein the electronic directory service is a network service that identifies all resources configured to a given network and an administrator of the electronic directory service determines user devices that can access each of the resources based on identifiers of the user devices, wherein the content delivery platform is configured (i) to determine the user devices to receive the application based on a query to the directory system to obtain the identifiers of the user devices that are to receive the media content, (ii) to receive from the directory system identifiers of the user devices that are to receive the media content in response to the query, and (iii) to push the application to present the indicator representing the media content to the user device based on the received identifiers;

activate the indicator to generate a request for the media content, the request including an ID associated with the user device;

initiate transfer of the request, over a wireless network to the content delivery platform, to obtain the media content; and receive the media content based on whether the content delivery platform determining that the ID included in the request for the media content matches one of the identifiers of the user devices in the directory system, wherein the indicator indicates a first indication for a first time that the media content has been published when the media content has not been previously published, and indicates a second indication, different from the first indication, for an update to the media content when the media content has been previously published, and wherein the received application includes information describing at the user device what the media content that is to be delivered is about and the information is displayed at the user device prior to initiating triggering of the request for the media content.

17. An apparatus according to claim 16, wherein the apparatus is further caused to:

receive the media content over a wireless network as a podcast.

18. An apparatus according to claim 16, wherein the directory system is configured to provide the directory service according to a lightweight directory access protocol (LDAP) to the content delivery platform.

19. An apparatus according to claim 16, wherein the apparatus is further caused to:

receive the media content over a data network as a stream, or receive the media content as a file over the data network.

20. An apparatus according to claim 16, wherein the application is received according to a predetermined schedule relating to off-peak hours of operations for the user device, the predetermined schedule being managed by the content delivery platform.

* * * * *